United States Patent
Shin et al.

(10) Patent No.: US 8,779,896 B2
(45) Date of Patent: Jul. 15, 2014

(54) RFID READER AND METHOD FOR CONTROLLING GAIN THEREOF

(75) Inventors: Dong-Beom Shin, Daejeon (KR); Jae-young Jung, Daejeon (KR); Sang Yeoun Lee, Daejeon (KR); Gil Young Choi, Daejeon (KR); Heyung Sub Lee, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 369 days.

(21) Appl. No.: 12/833,454

(22) Filed: Jul. 9, 2010

(65) Prior Publication Data

US 2011/0102151 A1    May 5, 2011

(30) Foreign Application Priority Data

Nov. 5, 2009   (KR) .................. 10-2009-0106560

(51) Int. Cl.
   *H04Q 5/22*   (2006.01)
(52) U.S. Cl.
   USPC ....................................... 340/10.1
(58) Field of Classification Search
   USPC ............. 340/10.1, 505; 375/231; 370/316
   See application file for complete search history.

(56) References Cited

U.S. PATENT DOCUMENTS

| 5,617,240 | A  | * | 4/1997  | Hergault et al. | 398/209  |
|-----------|----|---|---------|-----------------|----------|
| 6,272,623 | B1 | * | 8/2001  | Talcott         | 712/239  |
| 6,356,764 | B1 | * | 3/2002  | Ovard et al.    | 455/456.2|
| 7,830,970 | B2 | * | 11/2010 | De Bart et al.  | 375/260  |
| 2008/0024280 | A1 | * | 1/2008 | Kato         | 340/10.3 |

FOREIGN PATENT DOCUMENTS

| EP | 1 884 880       | 2/2008 |
| JP | 10-051252       | 2/1998 |
| KR | 10-0703828      | 3/2007 |
| KR | 10-0703828      | 4/2007 |
| KR | 10-0726549      | 6/2007 |
| KR | 10-0738397      | 7/2007 |
| KR | 10-0762826      | 9/2007 |
| KR | 10-2008-0078267 | 8/2008 |
| KR | 10-0911821      | 8/2009 |

OTHER PUBLICATIONS

"AD8330, Low Cost, DC to 150 MHz Variable Gain Amplifier", *Analog Devices*, pp. 1-32, 2003.

* cited by examiner

*Primary Examiner* — Vernal Brown
(74) *Attorney, Agent, or Firm* — Staas & Halsey LLP

(57) ABSTRACT

Provided are an RFID reader and a method for controlling a gain thereof. The RFID reader includes an amplifier and an AGC circuit. The amplifier controls the gain of an RX signal, received from an RFID tag, in response to an AGC signal. The AGC circuit measures a signal level in an ante-preamble period of the RX signal and generates an AGC signal to control the gain of the RX signal, on the basis of the measured signal level.

16 Claims, 6 Drawing Sheets

RFID READER AND METHOD FOR CONTROLLING GAIN THEREOF

CROSS-REFERENCE TO RELATED APPLICATIONS

This U.S. non-provisional patent application claims priority under 35 U.S.C. §119 of Korean Patent Application No. 10-2009-0106560, filed on Nov. 5, 2009, the entire contents of which are hereby incorporated by reference.

BACKGROUND OF THE INVENTION

The present invention disclosed herein relates to a Radio Frequency IDentification (RFID) system, and more particularly, to an RFID reader and a method for controlling a gain thereof.

In general, Radio Frequency IDentification (RFID) means a technology that inputs unique information in a small-sized IC chip and uses RF signals to identify/track/manage an object to which the IC chip is attached.

RFID systems include an RFID tag and an RFID reader. The RFID tag is attached to an object and has unique information inputted. The RFID reader reads information of the RFID tag in a noncontact manner. Also, the RFID reader is connected to an information processing device (e.g., a computer) to process data collected from the RFID tag.

The RFID reader detects information of RFID tags located at various distances therefrom. For RFID tag information detection, the level of a receive (RX) signal received by the RFID reader from the RFID tag may have to be higher than a predetermined level. If the level of an RX signal received from the RFID tag is too low or high, the RFID reader may fail to receive data stably.

SUMMARY OF THE INVENTION

Embodiments of the present invention provide an RFID reader controlling a receive (RX) signal received from an RFID tag in an RFID system, and a method for controlling a gain thereof.

Embodiments of the present invention also provide an RFID reader capable of receiving data stably by controlling the gain of an RX signal, and a method for controlling a gain thereof.

In some embodiments of the present invention, RFID readers include: an amplifier controlling the gain of an RX signal, received from an RFID tag, in response to an Automatic Gain Control (AGC) signal; and an AGC circuit measuring a signal level in an ante-preamble period of the RX signal and generating an AGC signal to control the gain of the RX signal, on the basis of the measured signal level.

In some embodiments, the AGC circuit measures the signal level by using a pilot signal included in the RX signal.

In other embodiments, the AGC circuit includes: a signal level measurer measuring the signal level of the RX signal; and an AGC signal generator generating an AGC signal by determining whether the signal level is within a stable RX signal level range.

In further embodiments, if the signal level is within the stable RX signal level range, the AGC signal generator generates an AGC signal to maintain the gain of the amplifier.

In still further embodiments, if the signal level is higher than the stable RX signal level range, the AGC signal generator generates an AGC signal to decrease the gain of the amplifier, and if the signal level is lower than the stable RX signal level range, the AGC signal generator generates an AGC signal to increase the gain of the amplifier.

In still further embodiments, the AGC signal generator generates an AGC signal by using a mapping table mapping the output gain of the RX signal controlled according to the signal level.

In still further embodiments, the AGC circuit includes a memory storing the mapping table.

In still further embodiments, the RFID reader includes: an analog-to-digital converter converting the RX signal into a digital signal and providing the digital signal to the AGC circuit; and a digital-to-analog converter converting the AGC signal into an analog signal and outputting the analog signal to the amplifier.

In other embodiments of the present invention, methods for controlling the gain of an RFID reader include: measuring a signal level in an ante-preamble period of an RX signal received from an RFID tag; generating an AGC signal on the basis of the measured signal level; and controlling the gain of the RX signal in response to the AGC signal.

In some embodiments, the measuring of the signal level includes measuring the signal level by using a pilot signal included in the RX signal.

In other embodiments, the generating of the AGC signal includes generating the AGC signal by determining whether the signal level is within a stable RX signal level range.

In further embodiments, if the signal level is within the stable RX signal level range, the AGC signal is an AGC signal to maintain the gain of an amplifier.

In still further embodiments, wherein if the signal level is higher than the stable RX signal level range, the AGC signal is an AGC signal to decrease the gain of the amplifier, and if the signal level is lower than the stable RX signal level range, the AGC signal is an AGC signal to increase the gain of the amplifier.

In still further embodiments, the AGC signal is generated using a mapping table mapping the output gain of the RX signal controlled according to the signal level.

In still further embodiments, the measuring of the signal level includes: converting the RX signal into a digital signal; and measuring the signal level by using the digital RX signal.

In still further embodiments, the controlling of the gain of the RX signal includes: converting the AGC signal into an analog signal; and controlling the gain of the RX signal by using the analog AGC signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Descriptions related to well-known functions or configurations will be omitted in order not to unnecessarily obscure the subject matters of the present invention.

The present invention provides an RFID reader in an RFID system and a method for controlling a gain of the RFID reader. According to the present invention, when receiving ID information of an RFID tag, the RFID reader controls the gain of a receive (RX) signal received from the RFID tag.

Signals, which are exchanged between the RFID reader and the RFID tag to acquire the ID information of the RFID tag, will be described below with reference to FIG. 1.

Figure 1:
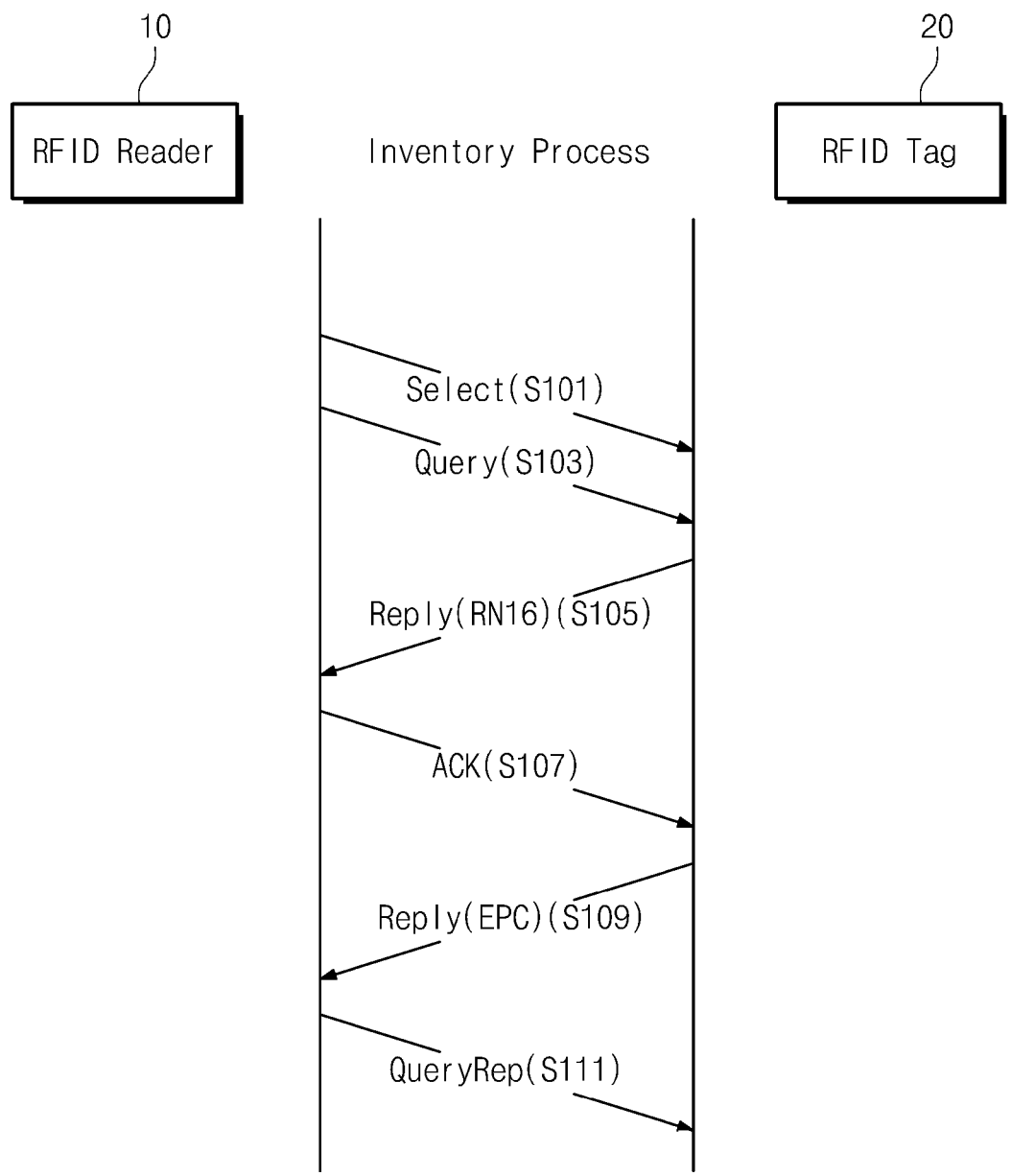
FIG. 1 is a signal flow diagram illustrating an inventory process between an RFID reader and an RFID tag in an RFID system according to an exemplary embodiment of the present invention.

FIG. 1 is a signal flow diagram illustrating an inventory process between an RFID reader and an RFID tag in an RFID system according to an exemplary embodiment of the present invention.

Referring to FIG. 1, an RFID system includes an RFID reader 10 and an RFID tag 20. An inventory process is a kind of search process for acquiring information transmitted from the RFID reader 10 to the RFID tag 20.

In step S101, the RFID reader 10 transmits a select message to the RFID tag 20. The select message is to select the RFID tag 20 (session determination).

In step S103, the RFID reader 10 transmits a query message to the RFID tag 20. The query message is to transmit control information related to an RX signal received from the RFID tag 20. For example, the query message includes information about a mode of a preamble signal and a data transmission rate.

When receiving the query message, the RFID tag 20 determines/sets a preamble mode/a transmission rate of a message to be transmitted to the RFID reader 10. Also, the RFID tag 20 maintains the preamble mode and the message transmission rate until receiving the next query message.

In step S105, the RFID tag 20 transmits a reply message to the RFID reader 10 in response to the query message. Herein, the reply message includes a random number (e.g., a 16-bit random number RN16) that is generated using an internal random number generator of the RFID tag 20.

When receiving the reply message including the random number, the RFID reader 10 transmits an acknowledgement message ACK to the RFID tag 20 in step S107. Herein, the acknowledgement message ACK includes a random number identical to the received random number. For example, when receiving the reply message including the 16-bit random number RN16, the RFID reader 10 transmits an acknowledgement message ACK including the 16-bit random number RN16 to the RFID tag 20.

When receiving the acknowledgement message ACK, the RFID tag 20 compares the internal random number (e.g., 'RN16') and the random number (e.g., 'RN16') received from the RFID reader 10. If the two random numbers are identical to each other, the RFID tag 20 transmits a reply message including an Electronic Product Code (EPC) to the RFID reader 10 in response to the received acknowledgement message ACK in step S109.

When receiving the reply message including the EPC, the RFID reader 10 transmits a query reply message QueryRep to the RFID tag 20 in step S111. The query reply message QueryRep is to terminate the current inventory process of the RFID tag 20.

As described above, the RFID reader 10 receives a first reply message including a random number (e.g., 'RN16') (in step S105) and a second reply message including an EPC (in step S109) from the RFID tag 20. The first reply message and the second reply message are transmitted through a reverse link (i.e., a link for transmission of a signal from the RFID tag 20 to the RFID reader 10).

The structures of the reply messages (i.e., the first reply message and the second reply message), if the RFID tag 20 uses a Frequency Modulation 0 (FM0) scheme, will be described below with reference to FIG. 2.

Figure 2:
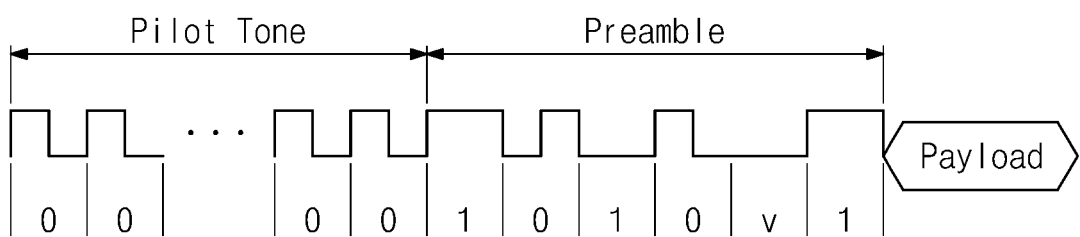
FIG. 2 is a diagram illustrating a structure of a reply message according to an exemplary embodiment of the present invention.

FIG. 2 is a diagram illustrating a structure of the reply message according to an exemplary embodiment of the present invention.

Referring to FIG. 2, the reply message includes a pilot tone, a preamble, and a payload. If the mode (TRext) of the preamble signal included in the query message (in step S103) is '1', the reply message may be the reply message transmitted from the RFID tag 20 to the RFID reader 10.

For example, the pilot tone may include twelve 0's. The preamble may include '1010v1'. In the case of the first reply message, the payload may include 'RN16'. In the case of the second reply message, the payload may include EPC'.

For example, the pilot tone may be used by the RFID reader 10 to detect the start point of the preamble or remove a DC offset. The preamble may be used by the RFID reader 10 to detect the start point of the payload.

For example, the RFID reader 10 controls the gain of the reply message (the first reply message or the second reply message) as illustrated in FIG. 2.

Figure 3:
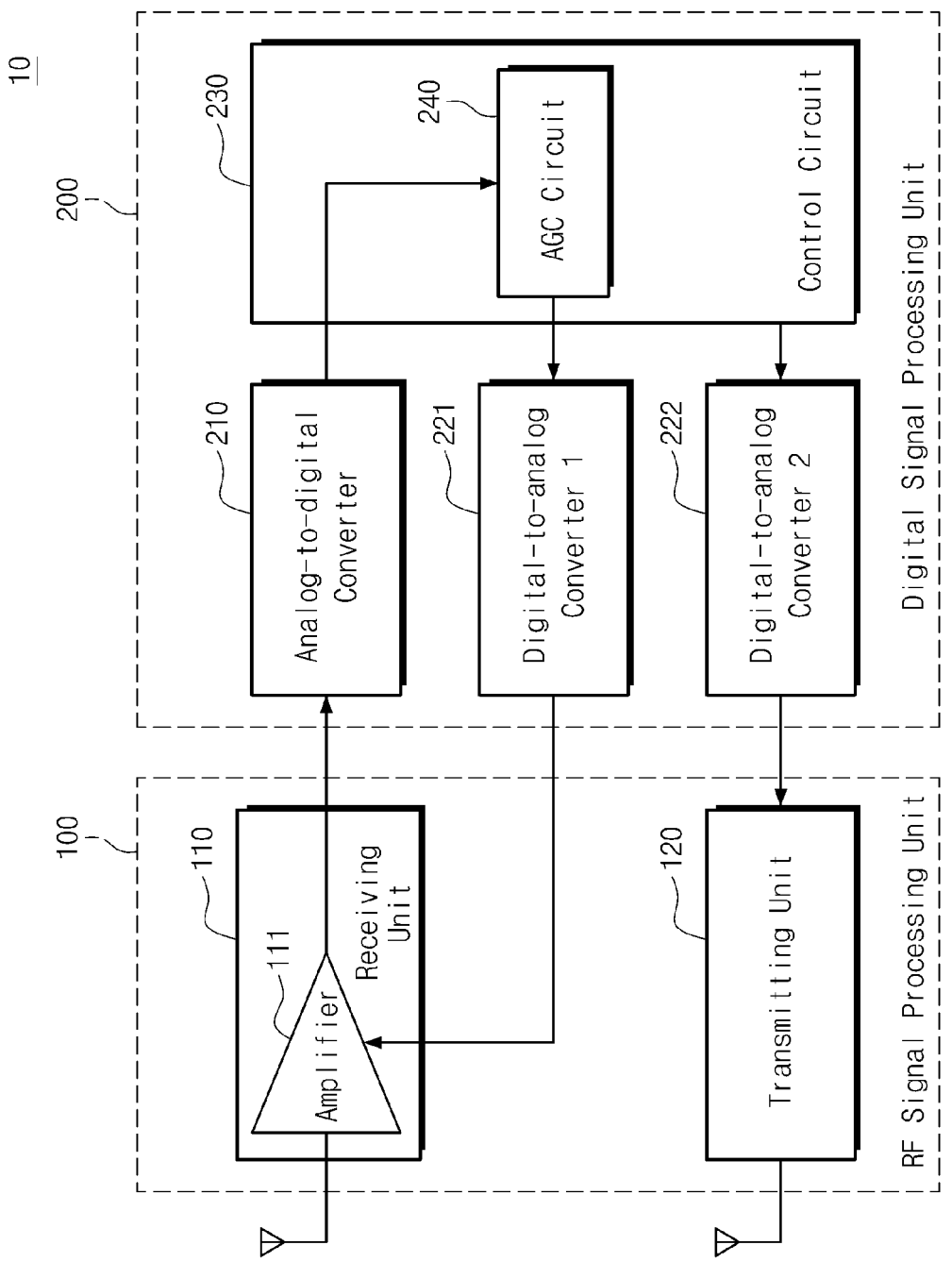
FIG. 3 is a block diagram of the RFID reader of FIG. 1 according to an exemplary embodiment of the present invention.

FIG. 3 is a block diagram of the RFID reader 10 of FIG. 1 according to an exemplary embodiment of the present invention.

Referring to FIG. 3, the RFID reader 10 includes a Radio Frequency (RF) signal processing unit 100 and a digital signal processing unit 200. The RF signal processing unit 100 may be included in an RF board, and the digital signal processing unit 200 may be included in a digital board.

The RF signal processing unit 100 includes a receiving unit 110 and a transmitting unit 120. The digital signal processing unit 200 includes an analog-to-digital converter 210, a first digital-to-analog converter 221, a second digital-to-analog converter 222, and a control circuit 230. The receiving unit 110 includes an amplifier 111 to control the gain of an RX signal. The control circuit 230 includes Automatic Gain Control (AGC) circuit 240 to control the gain of the amplifier 111. Herein, the AGC circuit 240 may be located outside the control circuit 230.

The second digital-to-analog converter 222 converts a transmit (TX) signal into an analog signal. The transmitting unit 120 transmits the analog TX signal to the RFID tag 20 through a TX antenna.

The receiving unit 110 receives TX information from the RFID tag 20 through an RX antenna. The analog-to-digital converter 210 converts the TX information of the RFID tag 20, received through the receiving unit 110, into a digital signal.

The control circuit 230 performs an overall control operation of the RFID reader 10 and an overall control operation for control of the gain of a signal received from the RFID tag 20.

The digital signal processing unit 200 may include a modem (not illustrated) including a Digital Signal Processor (DSP) or a Field Programmable Gate Array (FPGA) for modulation/demodulation of a TX/RX signal. The control circuit 240 modulates/demodulates the TX/RX signal through the modem (not illustrated).

According to the present invention, the RFID reader 10 includes the AGC circuit 240. The AGC circuit 240 performs a gain control operation of the amplifier 111 so that the gain of an RX signal (i.e., an RX signal received from the RFID tag 20) is maintained to be higher than a predetermined level (i.e., a stable signal reception level).

The AGC circuit 240 performs a gain control operation in a predetermined period, i.e., the period between the reception start point of an RX signal (e.g., a reply message) including information of the RFID tag 20 and the reception start point of a preamble of the RX signal. That is, the predetermined period is an AGC update period.

The RFID reader 10 detects the preamble by correlation energy calculation. If the RFID reader 10 performs an AGC operation in a preamble reception period, it may fail to normally receive the preamble. If failing to normally receive the preamble, the RFID reader 10 may be unable to detect the start point of the payload. Also, if the RFID reader 10 performs an AGC operation in a payload period, it may fail to normally receive payload data. If failing to normally receive the payload data, the RFID reader 10 may be unable to accurately detect the payload data.

Thus, the AGC circuit 240 performs a gain control operation before reception of the preamble and the payload, i.e., in an ante-preamble period. The AGC circuit 240 measures the signal level of an RX signal (e.g., a pilot signal) received before the preamble reception point. The AGC circuit 240 generates an AGC signal for the amplifier 111 on the basis of the measured signal level.

The first digital-to-analog converter 221 converts the AGC signal into an analog signal and outputs the analog AGC signal to the amplifier 111.

The amplifier 111 performs an AGC operation on the RX signal in response to the analog AGC signal.

As described above, the RFID reader 10 uses the AGC circuit 240 to control the gain of the amplifier 111 before the preamble reception point, thereby restoring the RX signal from the RFID tag 20 stably.

It has been illustrated in FIG. 3 that the RFID reader 10 uses independent TX/RX antennas. However, it will be understood that the present invention may also be applicable to an RFID reader in which transmitting/receiving units share one TX/RX antenna with each other by means of a circulator or a directional coupler.

Figure 4:
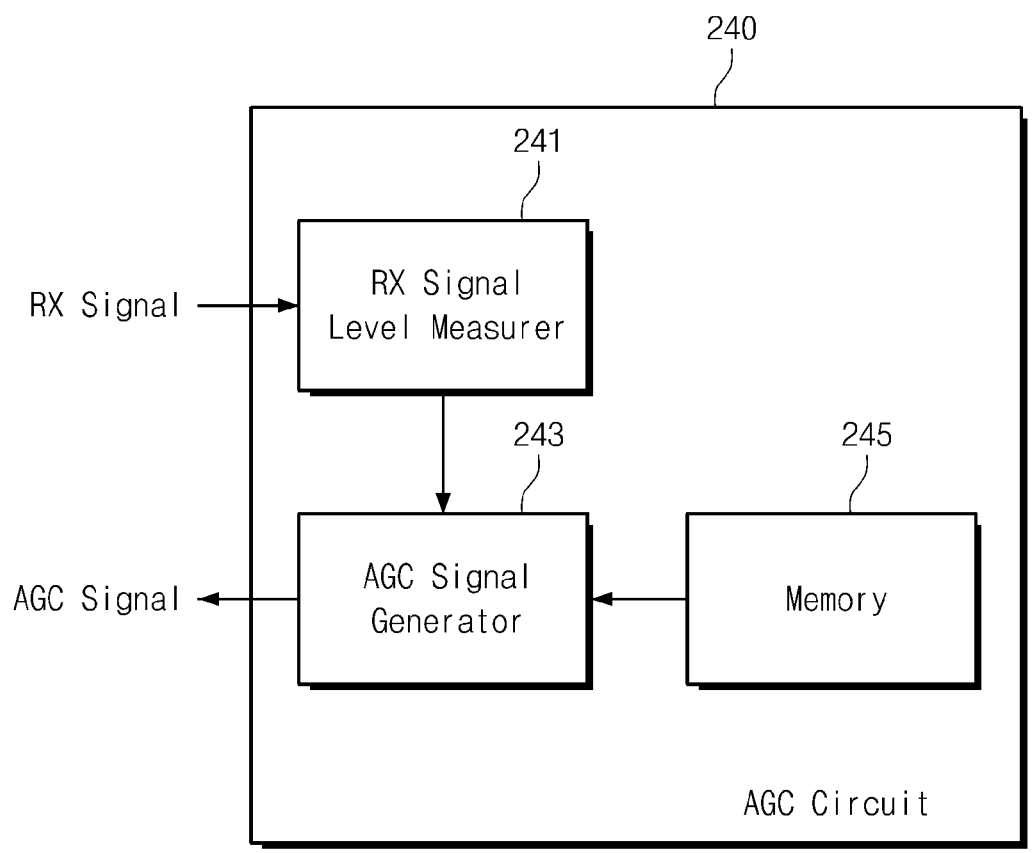
FIG. 4 is a block diagram of an AGC circuit of FIG. 3 according to an exemplary embodiment of the present invention.

FIG. 4 is a block diagram of the AGC circuit 240 of FIG. 3 according to an exemplary embodiment of the present invention.

Referring to FIG. 4, the AGC circuit 240 includes an RX signal level measurer 241, an AGC signal generator 243, and a memory 245. Herein, the memory 245 may be located outside the AGC circuit 240.

The RX signal level measurer 241 measures the signal level (i.e., the signal strength) of an RX signal received from the RFID tag 20. The RX signal level measurer 241 measures the signal level in an AGC update period. The AGC update period is the period between the reception start point of an RX signal from the RFID tag 20 and the reception start point of a preamble included in the RX signal.

The AGC signal generator 243 generates an AGC signal so that the signal level of an output signal of the receiving unit 110 is maintained to be equal to or higher than a predetermined signal level. The AGC signal generator 243 may use a mapping table to generate the AGC signal.

The mapping table may be stored in the memory 245. The mapping table includes output gains corresponding to signal levels. In the mapping table, the signal levels are mapped to the output gains.

The AGC signal generator 243 selects the output gain mapped to the measured signal level with reference to the mapping table stored in the memory 245. If the signal level is within a stable RX signal level range, the AGC signal generator 243 selects, with reference to the mapping table, the output gain for maintaining the current gain of the amplifier 111. If the signal level is higher the stable RX signal level range, the AGC signal generator 243 selects the output gain for decreasing the amplifier gain. If the signal level is lower the stable RX signal level range, the AGC signal generator 243 selects the output gain for increasing the amplifier gain. The mapping table will be described later in detail with reference to FIG. 5.

The AGC signal generator 243 generates an AGC signal on the basis of the output gain selected with reference to the mapping table.

Figure 5:
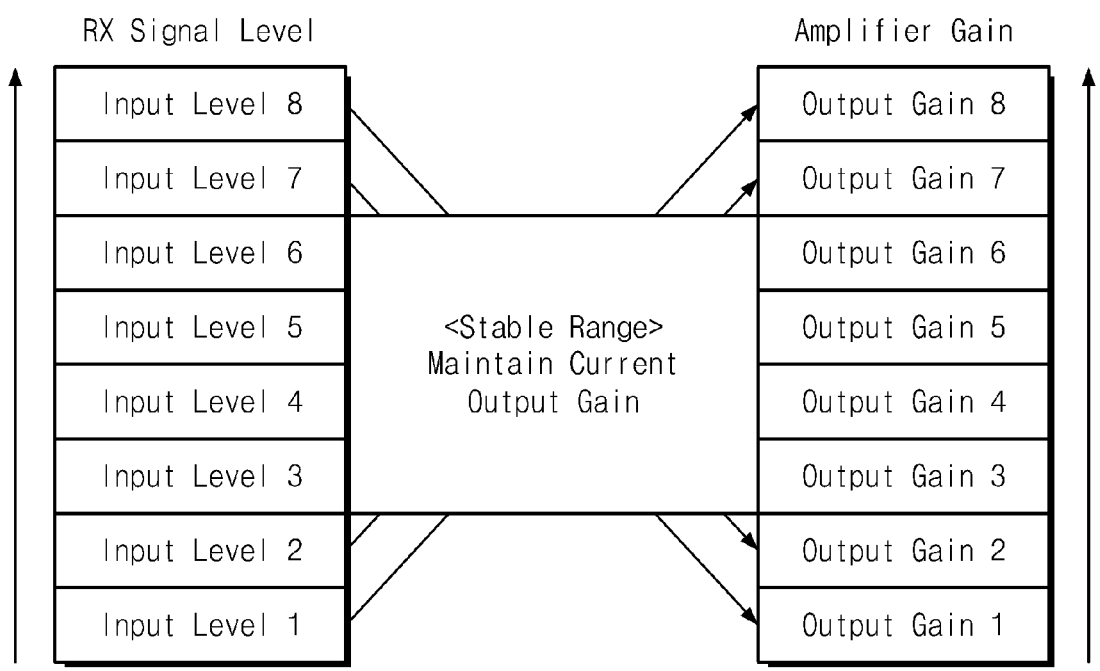
FIG. 5 is a conceptual diagram of a mapping table of FIG. 4 according to an exemplary embodiment of the present invention.

FIG. 5 is a conceptual diagram of the mapping table of FIG. 4 according to an exemplary embodiment of the present invention.

Referring to FIG. 5, the mapping table includes first to eighth input levels. Also, the mapping table includes first to eighth output gains corresponding to the first to eighth input levels.

In the mapping table, the third to sixth input levels correspond respectively to the third to sixth output gains in order to maintain the output gain of the amplifier 111 in the case of a stable RX signal level range (e.g., between the third input level and the sixth input level).

Also, the seventh and eighth input levels correspond respectively to the second and first output gains in order to decrease the output gain of the amplifier 111 in the case of a high RX signal level range (e.g., between the seventh input level and the eighth input level) higher than the stable RX signal level range.

Also, the first and second input levels correspond respectively to the eighth and seventh output gains in order to increase the output gain of the amplifier 111 in the case of a low RX signal level range (e.g., between the first input level and the second input level) lower than the stable RX signal level range.

The first input level is the highest and the eighth input level is the lowest. That is, the first to eighth input levels are arranged in descending order of input level. Also, the first output gain is the lowest and the eighth output gain is the highest. That is, the first to eighth output gains are arranged in ascending order of gain level.

The AGC circuit 240 maintains the current output gain if it is determined from the mapping table of FIG. 5 that the input level of the RX signal is within the stable RX signal level range. However, the AGC circuit 240 may control the output gain if the input level of the RX signal is out of the stable RX signal level range.

Figure 6:
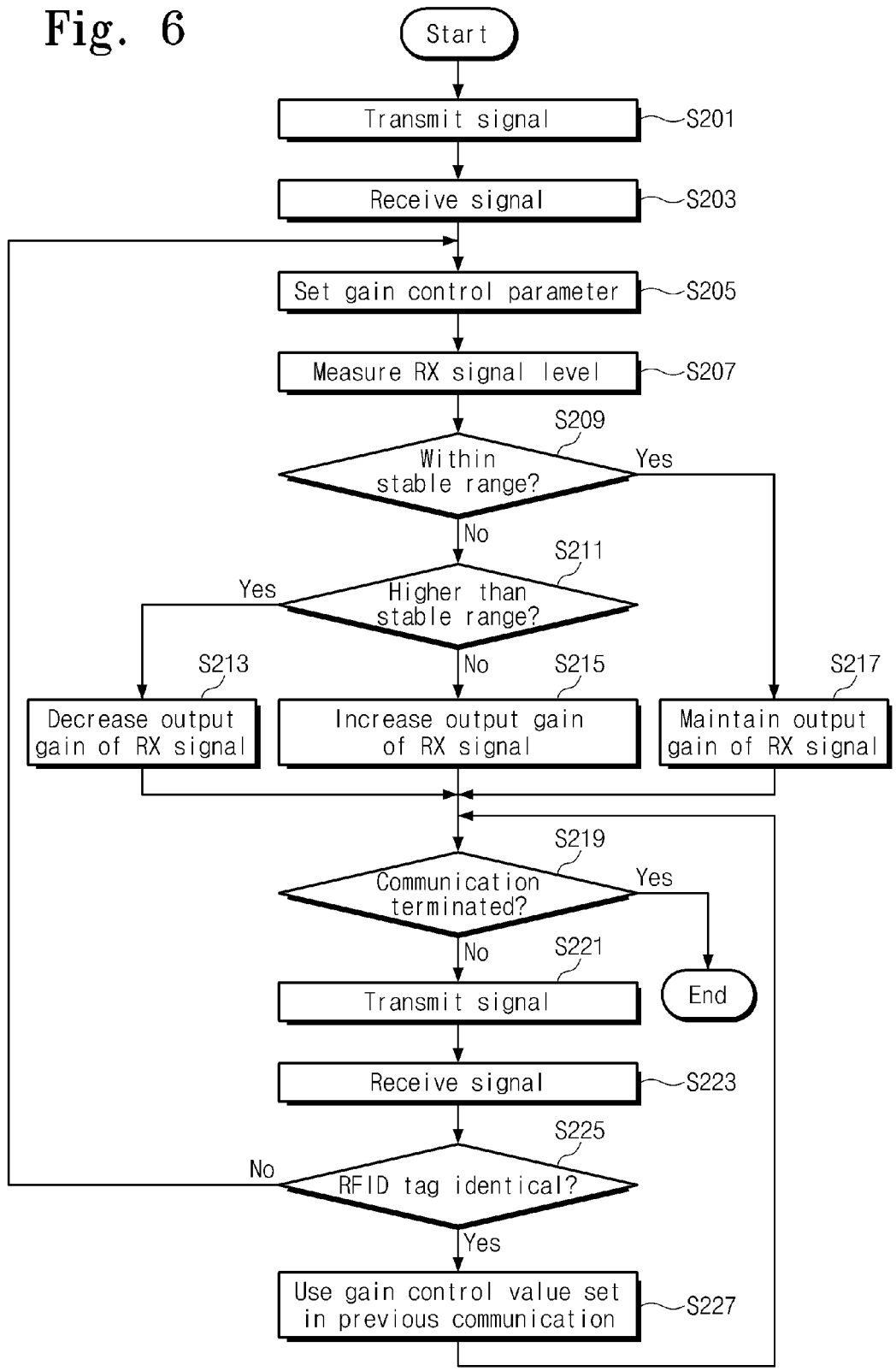
FIG. 6 is a flow chart illustrating an AGC operation of the RFID reader of FIG. 3 according to an exemplary embodiment of the present invention.

FIG. 6 is a flow chart illustrating an AGC operation of the RFID reader 10 of FIG. 3 according to an exemplary embodiment of the present invention.

Referring to FIG. 6, in step S201, the transmitting unit 120 transmits a TX signal to the RFID tag 20.

In step S203, the receiving unit 110 receives an RX signal, corresponding to the TX signal transmitted by the transmitting unit 120, from the RFID tag 20. Herein, the RX signal includes information of the RFID tag 20.

In step S205, the AGC circuit 240 sets gain control parameters. Herein, the gain control parameters include a gain control start time (e.g., the reception start point of the RX signal from the RFID tag 20), a gain control end time (e.g., before the reception point of a preamble of the RX signal), a gain control update period, a mapping between the output gain and the input level of a gain control table, and an AGC reference value (e.g., an AGC default value).

In step S207, the AGC circuit 240 measures the level of the RX signal in a predetermined period, e.g., the period between the gain control start time and the gain control end time.

In step S209, the AGC circuit 240 determines whether the level of the RX signal is within the stable RX signal level range. If it is determined in step S209 that the level of the RX signal is within the stable RX signal level range, the AGC circuit 240 proceeds to step S217. In step S217, the AGC circuit 240 maintains the output gain of the RX signal. Herein, the AGC circuit 240 generates an AGC signal, which is to maintain the current output state of the amplifier 111, to control the gain of the amplifier 111. Thereafter, the AGC circuit 240 proceeds to step S219.

If it is determined in step S209 that the level of the RX signal is out of the stable RX signal level range (e.g., between the third input level and the sixth input level in the mapping table of FIG. 5), the AGC circuit 240 proceeds to step S211. In step S211, the AGC circuit 240 determines whether the level of the RX signal is higher than the stable RX signal level range.

If it is determined in step S211 that the level of the RX signal is higher than the stable RX signal level range, the AGC circuit 240 proceeds to step S213. In step S213, the AGC circuit 240 decreases the output gain of the RX signal. Herein, the AGC circuit 240 generates an AGC signal, which is to increase the output gain of the amplifier 111, to control the gain of the amplifier 111. Thereafter, the AGC circuit 240 proceeds to step S219.

If it is determined in step S211 that the level of the RX signal is lower than the stable RX signal level range, the AGC circuit 240 proceeds to step S215. In step S215, the AGC circuit 240 increases the output gain of the RX signal. Herein, the AGC circuit 240 generates an AGC signal, which is to decrease the output gain of the amplifier 111, to control the gain of the amplifier 111. Thereafter, the AGC circuit 240 proceeds to step S219.

In step S219, the AGC circuit 240 determines whether the communication is terminated. If it is determined in step S219 that the communication is terminated, the AGC circuit 240 ends the AGC operation. If it is determined in step S219 that the communication is not terminated, the AGC circuit 240 proceeds to step S221.

In step S221, the transmitting unit 120 transmits a TX signal to the RFID tag 20.

In step S223, the receiving unit 110 receives an RX signal, corresponding to the TX signal transmitted by the transmitting unit 120, from the RFID tag 20. Herein, the RX signal includes information of the RFID tag 20.

In step S225, the AGC circuit 240 determines whether the current RFID tag is identical to the previous RFID tag. If it is determined in step S225 that the current RFID tag is not identical to the previous RFID tag, the AGC circuit 240 returns to step S205. On the other hand, if it is determined in step S225 that the current RFID tag is identical to the previous RFID tag, the AGC circuit 240 proceeds to step S227.

In step S227, the AGC circuit 240 uses the previous gain control value to generate an AGC signal. That is, the AGC circuit 240 generates an AGC signal identical to the AGC signal used in the previous communication with the RFID tag 20. Thereafter, the AGC circuit 240 returns to step S219. For example, if the RX signal of step S203 is the first reply message including the RN16 (see FIG. 1), the RX signal of step S223 may be the second reply message including the EPC (see FIG. 1).

As described above, the RFID reader according to the present invention includes the AGC circuit to maintain the output gain of the RX signal amplifier to be higher than a predetermined gain for signal restoration in the RFID reader, thereby making it possible to prevent an RX signal detection error. In particular, the RFID reader performs a gain control operation in an ante-preamble (or ante-payload) period, thereby making it possible to stably receive the RX signal from the RFID tag.

The present invention is applicable to any RFID system that uses a passive or semi-passive RFID reader.

As described above, the RFID reader according to the present invention performs an AGC (Automatic Gain Control) operation in an ante-preamble period of an RX signal received from the RFID tag, thus making it possible to maintain the gain of the RX signal to be higher than a predetermined level. Also, the RFID reader controls the gain of the RX signal, thus making it possible to receive data stably.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Radio Frequency IDentification (RFID) reader comprising:
   an amplifier controlling the gain of a receive (RX) signal, received from an RFID tag, in response to an Automatic Gain Control (AGC) signal; and
   an AGC circuit measuring a signal level in an ante-preamble period of the RX signal during a pilot signal and generating an AGC signal to control the gain of the RX signal, on the basis of the measured signal level.

2. The RFID reader of claim 1, wherein the AGC circuit measures the signal level by using a pilot signal included in the RX signal.

3. The RFID reader of claim 1, wherein the AGC circuit comprises:
   a signal level measurer measuring the signal level of the RX signal; and
   an AGC signal generator generating an AGC signal by determining whether the signal level is within a stable RX signal level range.

4. The RFID reader of claim 3, wherein if the signal level is within the stable RX signal level range, the AGC signal generator generates an AGC signal to maintain the gain of the amplifier.

5. The RFID reader of claim 4, wherein if the signal level is higher than the stable RX signal level range, the AGC signal generator generates an AGC signal to decrease the gain of the amplifier, and if the signal level is lower than the stable RX signal level range, the AGC signal generator generates an AGC signal to increase the gain of the amplifier.

6. The RFID reader of claim 3, wherein the AGC signal generator generates an AGC signal by using a mapping table mapping the output gain of the RX signal controlled according to the signal level.

7. The RFID reader of claim 6, wherein the AGC circuit comprises a memory storing the mapping table.

8. The RFID reader of claim 1, wherein the RFID reader comprises:
- an analog-to-digital converter converting the RX signal into a digital signal and providing the digital signal to the AGC circuit; and
- a digital-to-analog converter converting the AGC signal into an analog signal and outputting the analog signal to the amplifier.

9. A method for controlling the gain of a Radio Frequency IDentification (RFID) reader, comprising:
- measuring a signal level in an ante-preamble period of a receive (RX) signal during a pilot signal received from an RFID tag;
- generating an Automatic Gain Control (AGC) signal on the basis of the measured signal level; and
- controlling the gain of the RX signal in response to the AGC signal.

10. The method of claim 9, wherein the measuring of the signal level comprises measuring the signal level by using a pilot signal included in the RX signal.

11. The method of claim 9, wherein the generating of the AGC signal comprises generating the AGC signal by determining whether the signal level is within a stable RX signal level range.

12. The method of claim 11, wherein if the signal level is within the stable RX signal level range, the AGC signal is an AGC signal to maintain the gain of an amplifier.

13. The method of claim 12, wherein if the signal level is higher than the stable RX signal level range, the AGC signal is an AGC signal to decrease the gain of the amplifier, and if the signal level is lower than the stable RX signal level range, the AGC signal is an AGC signal to increase the gain of the amplifier.

14. The method of claim 11, wherein the AGC signal is generated using a mapping table mapping the output gain of the RX signal controlled according to the signal level.

15. The method of claim 9, wherein the measuring of the signal level comprises:
- converting the RX signal into a digital signal; and
- measuring the signal level by using the digital RX signal.

16. The method of claim 9, wherein the controlling of the gain of the RX signal comprises:
- converting the AGC signal into an analog signal; and
- controlling the gain of the RX signal by using the analog AGC signal.

* * * * *